(12) United States Patent
Choi et al.

(10) Patent No.: US 12,004,702 B2
(45) Date of Patent: Jun. 11, 2024

(54) MOBILE ROBOT AND METHOD OF CONTROLLING MOBILE ROBOT

(71) Applicant: LG ELECTRONICS INC., Seoul (KR)

(72) Inventors: Juno Choi, Seoul (KR); Janghun Cheong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 17/423,381

(22) PCT Filed: Jan. 17, 2020

(86) PCT No.: PCT/KR2020/000861
§ 371 (c)(1),
(2) Date: Jul. 15, 2021

(87) PCT Pub. No.: WO2020/149697
PCT Pub. Date: Jul. 23, 2020

(65) Prior Publication Data
US 2022/0125255 A1    Apr. 28, 2022

(30) Foreign Application Priority Data
Jan. 17, 2019    (KR) .......................... 10-2019-0006058

(51) Int. Cl.
*A47L 9/00* (2006.01)
*A47L 9/28* (2006.01)
*G05D 1/00* (2006.01)

(52) U.S. Cl.
CPC ............. *A47L 9/009* (2013.01); *A47L 9/2826* (2013.01); *G05D 1/0212* (2013.01);
(Continued)

(58) Field of Classification Search
CPC .... A47L 9/009; A47L 9/2826; A47L 2201/04; A47L 2201/06; G05D 1/0212; G05D 1/0248
See application file for complete search history.

(56) References Cited

U.S. PATENT DOCUMENTS

2007/0267570 A1* 11/2007 Park ..................... A47L 9/2826
                                                            250/221
2007/0271004 A1* 11/2007 Kim ..................... G05D 1/0227
                                                            318/568.12
(Continued)

FOREIGN PATENT DOCUMENTS

KR     10-0735565 B1      7/2007
KR     20170103556 A  *   9/2017
(Continued)

*Primary Examiner* — Redhwan K Mawari
(74) *Attorney, Agent, or Firm* — Birch, Stewart, Kolasch & Birch, LLP

(57) ABSTRACT

Disclosed is a mobile robot including a driver configured to move a main body, an image obtainer configured to obtain an image of the surroundings and far and near distances between the main body and an obstacle, and a controller configured to analyze the image and the far and near distances obtained by the image obtainer and to determine whether an obstacle is present near the main body. The controller determines whether the obstacle is a mat-type obstacle. Upon determining that the obstacle is a mat-type obstacle, the controller calculates the planar area of the mat-type obstacle, and determines a climbing operation or an avoidance operation of the main body based on the planar area of the mat-type obstacle.

12 Claims, 11 Drawing Sheets

(52) U.S. Cl.
CPC ........ *G05D 1/0248* (2013.01); *A47L 2201/04* (2013.01); *A47L 2201/06* (2013.01)

(56) References Cited

U.S. PATENT DOCUMENTS

| | | | | |
|---|---|---|---|---|
| 2015/0182088 A1* | 7/2015 | Kim | ................ | A47L 9/2805 15/319 |
| 2015/0202771 A1* | 7/2015 | Lee | ................ | G05D 1/0251 901/1 |
| 2016/0099009 A1* | 4/2016 | Kim | ................ | H04S 7/307 381/17 |
| 2016/0101524 A1* | 4/2016 | Noh | ................ | G06T 7/11 901/1 |
| 2016/0104044 A1* | 4/2016 | Noh | ................ | G06V 20/10 901/1 |
| 2017/0280958 A1* | 10/2017 | Love | ................ | G01S 17/931 |
| 2018/0020893 A1* | 1/2018 | Lee | ................ | G05D 1/0274 701/28 |
| 2019/0236058 A1* | 8/2019 | Komala | ................ | H04L 67/02 |
| 2021/0365041 A1* | 11/2021 | Lee | ................ | B25J 9/16 |

FOREIGN PATENT DOCUMENTS

| | | | |
|---|---|---|---|
| KR | 10-1920140 B1 | | 11/2018 |
| KR | 20180085589 A | * | 11/2018 |
| KR | 10-1931385 B1 | | 12/2018 |
| WO | WO 2019/004618 A1 | | 1/2019 |

* cited by examiner

Map

Map

MOBILE ROBOT AND METHOD OF CONTROLLING MOBILE ROBOT

CROSS-REFERENCES TO RELATED APPLICATIONS

This application is the National Stage filing under 35 U.S.C. 371 of International Application No. PCT/KR20201000861, filed on Jan. 17, 2020, which claims the benefit of earlier filing date and right of priority to Korean Application No. 10-2019-0006058 filed on Jan. 17, 2019. The contents of all the above-referenced applications are hereby incorporated by reference herein in their entirety.

BACKGROUND

Technical Field

The present disclosure relates to a mobile robot, and more particularly to a mobile robot capable of distinguishing between an obstacle that the mobile robot is capable of climbing and an obstacle that the mobile robot is incapable of climbing, among mat-type obstacles.

Background

Robots have been developed for industrial purposes and have taken charge of portions of factory automation. In recent years, the fields in which robots are utilized have further expanded. As a result, medical robots, aerospace robots, etc. have been developed. In addition, home robots that may be used in general houses haven been manufactured. Among such robots, a robot capable of autonomously traveling is called a mobile robot. A representative example of mobile robots used in general houses is a robot cleaner.

Various kinds of technologies of sensing the environment and a user around a robot cleaner using various sensors provided in the robot cleaner are known. In addition, technologies in which a robot cleaner learns and maps a cleaning area by itself and detects a current position on a map are known. A robot cleaner capable of performing cleaning while traveling a cleaning area in a predetermined manner is known.

A conventional robot cleaner detects the distance to an obstacle or a wall and maps the environment around the cleaner using an optical sensor, which is advantageous in detecting a distance, detecting terrain, and obtaining an image of an obstacle.

In a conventional method of controlling a robot cleaner disclosed in Korean Patent Laid-open Publication No. 10-2014-0138555, the presence or absence of an obstacle in the vicinity of a cleaner is determined by radiating light having a predetermined pattern, obtaining an image of the region onto which the light is radiated, and detecting the pattern.

However, the above conventional technology is not capable of distinguishing a mat-type obstacle, or determines whether a mobile robot is capable of climbing an obstacle based only on the height of the obstacle. Thus, the above conventional technology is not capable of determining whether a mat-type obstacle is a carpet that a mobile robot is capable of climbing and cleaning or a foot mat that a mobile robot is incapable of climbing.

In addition, since the conventional technology is not capable of distinguishing between a carpet and a foot mat, a driver of a mobile robot may be caught on a foot mat, or the mobile robot may be damaged while climbing the foot mat. Further, the mobile robot may erroneously avoid attempting to climb a carpet, and thus the top surface of the carpet may not be cleaned.

SUMMARY

Technical Problem

Therefore, the present disclosure has been made in view of the above problems, and it is an object of the present disclosure to provide a mobile robot capable of distinguishing between an obstacle that the mobile robot is capable of climbing and an obstacle that the mobile robot is incapable of climbing, among mat-type obstacles, using a three-dimensional depth camera.

It is another object of the present disclosure to provide a mobile robot capable of determining whether the mobile robot is capable of climbing a mat-type obstacle based on an image without needing to contact the mat-type obstacle.

It is a further object of the present disclosure to provide a mobile robot capable of accurately determining whether a mat-type obstacle is an obstacle that the mobile robot is capable of climbing in order to clean a mat-type obstacle without any errors and to minimize damage to the mobile robot.

Technical Solution

In accordance with the present disclosure, the above objects can be accomplished by the provision of a mobile robot configured to determine whether to climb or avoid a mat-type obstacle by analyzing an obtained image and far and near distances to the obstacle.

In accordance with an aspect of the present disclosure, there is provided a mobile robot including a driver configured to move a main body, an image obtainer configured to obtain an image of the surroundings and far and near distances between the main body and an obstacle, and a controller configured to analyze the image and the far and near distances obtained by the image obtainer and to determine whether an obstacle is present near the main body. The controller determines whether the obstacle is a mat-type obstacle. Upon determining that the obstacle is a mat-type obstacle, the controller calculates the planar area of the mat-type obstacle, and determines a climbing operation or an avoidance operation of the main body based on the planar area of the mat-type obstacle.

The controller may determine the mat-type obstacle based on similarity between an image of a reference obstacle and an image of the obstacle in the obtained image.

When the height of the obstacle in the obtained image is less than a predetermined height, the controller may determine that the obstacle is a mat-type obstacle.

When the planar area of mat-type obstacle exceeds a predetermined planar area value, the controller may control the driver such that the main body climbs the mat-type obstacle.

The mobile robot may further include a cleaning device configured to perform a cleaning function. When the main body is located on the mat-type obstacle, the controller may control the cleaning device to perform cleaning corresponding to the mat-type obstacle.

The controller may determine a change in the shape of the mat-type obstacle based on the image of the mat-type obstacle while the main body is climbing the mat-type obstacle.

When the change in the shape of the mat-type obstacle exceeds a predetermined reference level, the controller may control the driver such that the main body stops climbing the mat-type obstacle and avoids the mat-type obstacle.

When the change in the shape of the mat-type obstacle is equal to or less than a predetermined reference level, the controller may control the driver such that the main body completely climbs the mat-type obstacle.

When the planar area of mat-type obstacle is equal to or less than a predetermined planar area value, the controller may control the driver such that the main body avoids the mat-type obstacle.

When an image of the overall shape of the mat-type obstacle is not obtained, the controller may control the driver and the image obtainer to obtain an image of the overall shape of the mat-type obstacle while traveling around the mat-type obstacle.

The controller may calculate the planar area of the mat-type obstacle after obtaining the image of the overall shape of the mat-type obstacle.

The image obtainer may include a three-dimensional depth camera.

In accordance with another aspect of the present disclosure, there is provided a method of controlling a mobile robot, the method including obtaining an image of the surroundings of the mobile robot and far and near distances between the mobile robot and an obstacle, determining an obstacle based on the obtained image and far and near distances and determining whether the obstacle is a mat-type obstacle, calculating the planar area of the mat-type obstacle, and controlling the mobile robot to climb the mat-type obstacle when the planar area of the mat-type obstacle exceeds a predetermined planar area value.

The method may further include controlling the mobile robot to avoid the mat-type obstacle when the planar area of the mat-type obstacle is less than the predetermined planar area value.

The method may further include controlling the mobile robot to stop climbing the mat-type obstacle and to avoid the mat-type obstacle when a change in the shape of the mat-type obstacle exceeds a predetermined reference level while the mobile robot is climbing the mat-type obstacle.

Advantageous Effects

According to the mobile robot of the present disclosure, there are one or more effects as follows.

First, the mobile robot may determine whether to climb a mat-type obstacle based on an image of the mat-type obstacle without needing to directly climb the mat-type obstacle, thereby recognizing the type of the obstacle without contacting the same and minimizing the risk of damage to the robot cleaner, which may occur when a mat-type obstacle is caught in the mobile robot.

Second, the mobile robot may determine whether to climb or avoid a mat-type obstacle merely by calculating the planar area of the mat-type obstacle, thereby minimizing a load applied to a controller to control the climbing on the mat-type obstacle.

Third, the mobile robot may store information about the planar area, height, and the like of a mat-type obstacle in a map, thereby making it possible to immediately determine whether to climb the mat-type obstacle when another mobile robot is cleaning the same space.

Fourth, upon detecting a change in the shape of a mat-type obstacle while climbing the mat-type obstacle, the mobile robot may stop climbing the mat-type obstacle and may avoid the same, thereby revising the determination on whether to climb the mat-type obstacle based on an image thereof and preventing the occurrence of breakdown during climbing.

Fifth, since the mobile robot avoids a mat-type obstacle that is not climbable and preferentially cleans a region in the cleaning area, excluding the mat-type obstacle, it is possible to rapidly realize cleaning.

However, the effects achievable through the present disclosure are not limited to the above-mentioned effects, and other effects not mentioned herein will be clearly understood by those skilled in the art from the appended claims.

DETAILED DESCRIPTION

Figure 1:
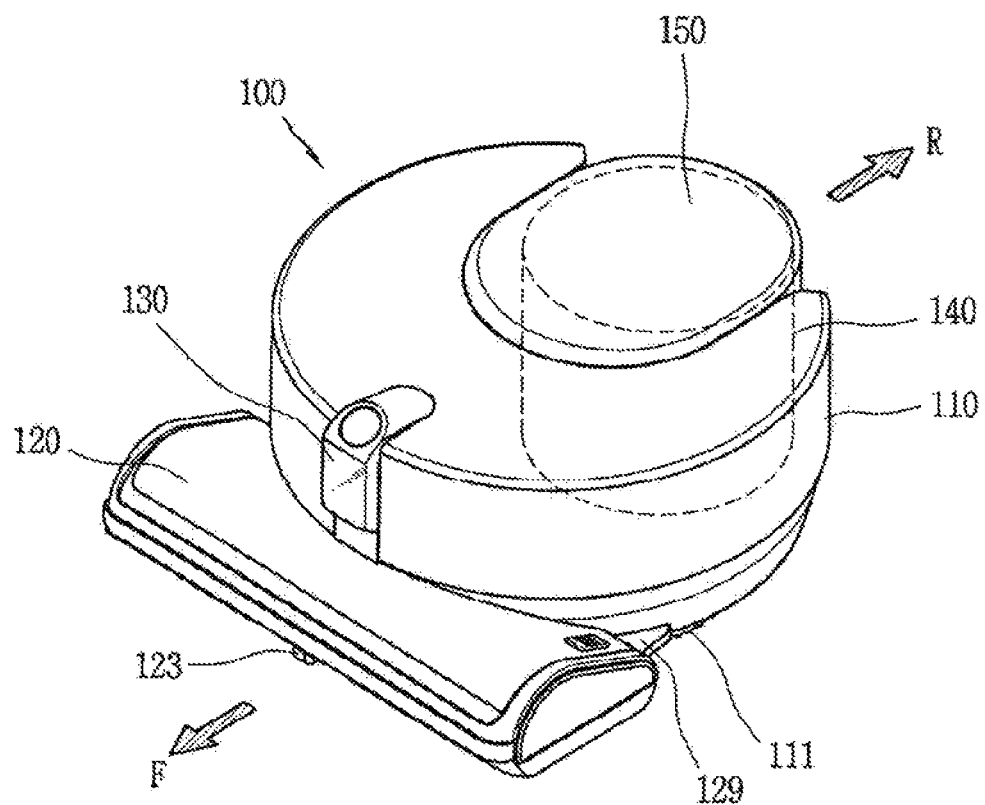
FIG. 1 is a perspective view showing an example of a robot cleaner according to the present disclosure.

Advantages and features of the present disclosure and methods for achieving them will be made clear from the embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the present disclosure to those skilled in the art. The present disclosure is merely defined by the scope of the claims. Like reference numerals refer to like elements throughout the specification.

Spatially relative terms such as "below", "beneath", "lower", "above", or "upper" may be used herein to describe one element's relationship to another element as illustrated in the figures. It will be understood that such spatially relative terms are intended to encompass different orientations of the device in addition to the orientation depicted in the figures. For example, if the device in one of the figures is turned over, elements described as "below" or "beneath" other elements would then be oriented "above" the other elements. The exemplary terms "below" or "beneath" can, therefore, encompass both positional relationships of above and below. Since the device may be oriented in another direction, spatially relative terms may be interpreted in accordance with the orientation of the device.

The terminology used in the present disclosure is for the purpose of describing particular embodiments only, and is not intended to limit the disclosure. As used in the disclosure and the appended claims, the singular forms "a", "an" and "the" are intended to include the plural forms as well, unless the context clearly indicates otherwise. It will be further understood that the terms "comprises" and/or "comprising", when used in this specification, specify the presence of stated components, steps, and/or operations, but do not preclude the presence or addition of one or more other components, steps, and/or operations.

Unless otherwise defined, all terms (including technical and scientific terms) used herein have the same meanings as those commonly understood by one of ordinary skill in the art. It will be further understood that terms such as those defined in commonly used dictionaries should be interpreted as having meanings consistent with their meanings in the context of the relevant art and the present disclosure, and are not to be interpreted in an idealized or overly formal sense unless expressly so defined herein.

A mobile robot 100 according to the present disclosure may be a robot that is capable of autonomously traveling using wheels or the like, e.g. a home robot for household uses, a robot cleaner, or the like.

Hereinafter, a robot cleaner according to the present disclosure will be described in more detail with reference to the drawings.

Embodiments disclosed in this specification will be described below in detail with reference to the accompanying drawings. It should be noted that technological terms used herein are used merely to describe a specific embodiment, not to limit the scope of the present disclosure.

Figure 2:
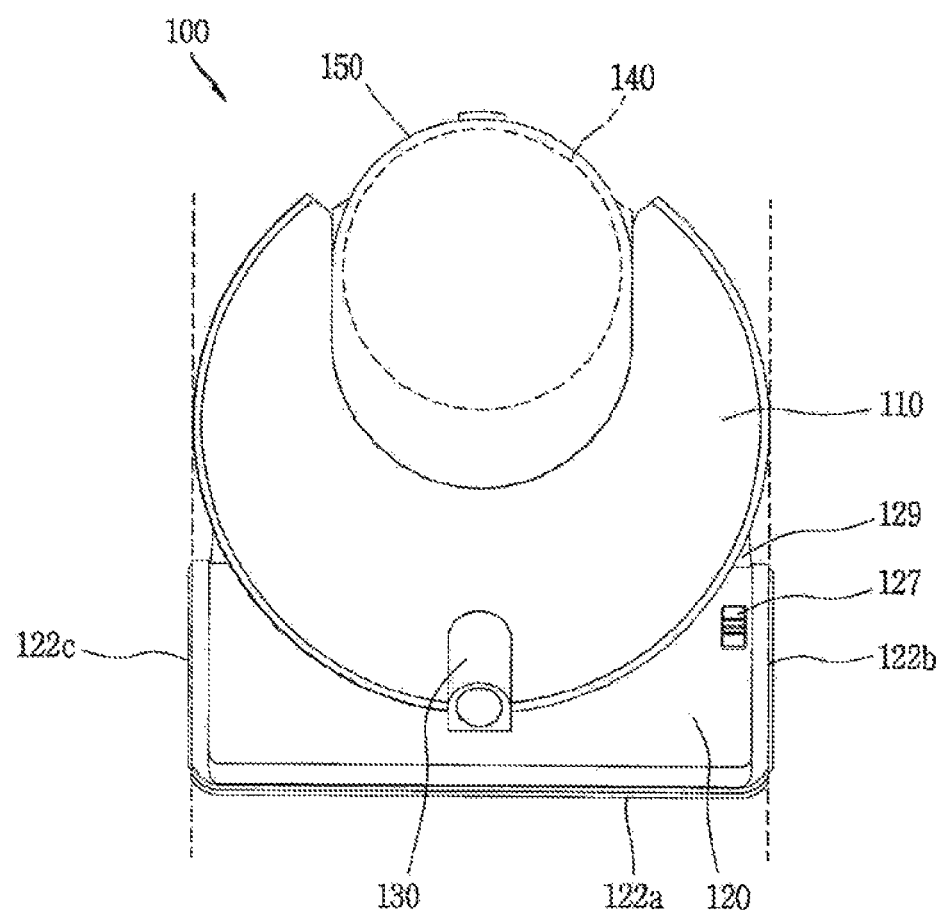
FIG. 2 is a plan view of the robot cleaner shown in FIG. 1.
Figure 3:
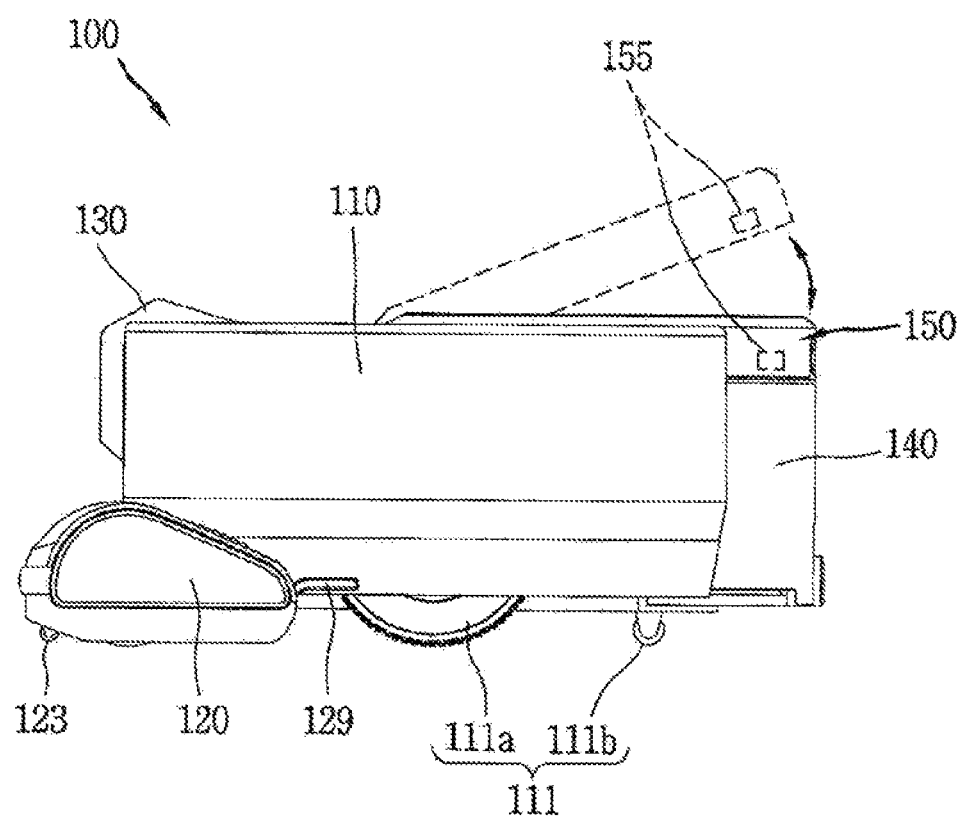
FIG. 3 is a side view of the robot cleaner shown in FIG. 1.

FIG. 1 is a perspective view showing an example of the mobile robot 100 according to the present disclosure, FIG. 2 is a plan view of the mobile robot 100 shown in FIG. 1, and FIG. 3 is a side view of the mobile robot 100 shown in FIG. 1.

In this specification, the terms "mobile robot", "robot cleaner", and "autonomous-driving cleaner" may have the same meaning. In addition, the plurality of cleaners described herein may commonly include at least some of the components to be described below with reference to FIGS. 1 to 3.

Referring to FIGS. 1 to 3, the robot cleaner 100 may perform a function of cleaning the floor while autonomously traveling in a predetermined area. Here, the floor cleaning may include suctioning dust (which includes foreign substances) or floor wiping.

The robot cleaner 100 may include a cleaner body 110, a suction head 120, a sensor 130, and a dust collector 140. A controller 1800 configured to control the robot cleaner 100 and various components may be accommodated in or mounted to the cleaner body 110. In addition, a wheel 111 configured to drive the robot cleaner 100 may be provided at the cleaner body 110. The robot cleaner 100 may be moved in a forward, backward, leftward, or rightward direction, or may be rotated by the wheel 111.

Referring to FIG. 3, the wheel 111 may include a main wheel 111a and a sub-wheel 111b.

The main wheel 111a may be provided in a plural number such that the main wheels 111a are provided at opposite sides of the cleaner body 110, respectively. The main wheels 111a may be configured to be rotated in a forward direction or in a reverse direction in response to a control signal from the controller. Each of the main wheels 111a may be configured to be independently driven. For example, the main wheels 111a may be driven by different respective motors. Alternatively, the main wheels 111a may be driven by different shafts respectively coupled to a single motor.

The sub-wheel 111b may support the cleaner body 110 along with the main wheels 111a and may assist in the driving of the robot cleaner 100 by the main wheels 111a. The sub-wheel 111b may also be provided at the suction head 120 to be described later.

The controller may control the driving of the wheel 111 such that the robot cleaner 100 autonomously travels the floor.

A battery (not shown) configured to supply power to the robot cleaner 100 may be mounted in the cleaner body 110. The battery may be configured to be rechargeable, and may be detachably mounted to the bottom surface of the cleaner body 110.

As shown in FIG. 1, the suction head 120 may protrude from one side of the cleaner body 110 and may serve to suction air containing dust or to wipe the floor. The one side may be the side of the cleaner body 110 that is oriented in a forward direction F, i.e. the front side of the cleaner body 110.

The drawings illustrate a configuration in which the suction head 120 protrudes from the one side of the cleaner body 110 in the forward direction and in the leftward and rightward directions. In detail, the front end of the suction head 120 may be spaced apart from the one side of the cleaner body 110 in the forward direction, and the left and right ends of the suction head 120 may be spaced apart from the one side of the cleaner body 110 in the leftward and rightward directions, respectively.

The cleaner body 110 may be formed in a circular shape and the left and right sides of the rear end of the suction head 120 may protrude from the cleaner body 110 in the leftward and rightward directions, and thus an empty space, i.e. a gap, may be formed between the cleaner body 110 and the suction head 120. The empty space may be space between the left and right ends of the cleaner body 110 and the left and right ends of the suction head 120 and may have a shape recessed to the inner side of the robot cleaner 100.

When an obstacle is caught in the empty space, the robot cleaner 100 may be caught by the obstacle and become incapable of moving. In order to prevent this, a cover member 129 may be disposed so as to cover at least a portion of the empty space.

The cover member 129 may be provided at the cleaner body 110 or the suction head 120. In this embodiment, the cover member 129 may protrude from each of the left and right sides of the rear end of the suction head 120 and may cover the outer circumferential surface of the cleaner body 110.

The cover member 129 may be disposed so as to fill at least a portion of the empty space, i.e. the empty space between the cleaner body 110 and the suction head 120. Accordingly, an obstacle may be prevented from being caught in the empty space, or even if an obstacle is caught in the empty space, the robot cleaner 100 may easily avoid the obstacle.

The cover member 129 protruding from the suction head 120 may be supported by the outer circumferential surface of the cleaner body 110. When the cover member 129 protrudes from the cleaner body 110, the cover member 129 may be supported by the rear surface portion of the suction head 120. According to the above structure, when the suction head 120 collides with an obstacle and is shocked thereby, a portion of the shock may be transmitted to the cleaner body 110, and thus the shock may be dispersed.

The suction head 120 may be detachably coupled to the cleaner body 110. When the suction head 120 is separated from the cleaner body 110, a mop (not shown) may replace the separated suction head 120, and may be detachably coupled to the cleaner body 110.

Accordingly, when a user intends to remove dust from the floor, the user may install the suction head 120 on the cleaner body 110, and when the user intends to wipe the floor, the user may install the mop on the cleaner body 110.

When the suction head 120 is installed to the cleaner body 110, the installation may be guided by the aforementioned cover member 129. That is, the cover member 129 may be disposed so as to cover the outer circumferential surface of the cleaner body 110, and thus the position of the suction head 120 relative to the cleaner body 110 may be determined.

The suction head 120 may be provided with a caster 123. The caster 123 may be configured to assist driving of the robot cleaner 100 and to support the robot cleaner 100. The sensor 130 may be disposed on the cleaner body 110. As illustrated, the sensor 130 may be disposed on the side of the cleaner body 110 on which the suction head 120 is disposed, i.e. on the front side of the cleaner body 110.

The sensor 130 may be disposed so as to overlap the suction head 120 in the upward-and-downward direction of the cleaner body 110. The sensor 130 may be disposed on the suction head 120 and may detect a forward obstacle, a geographic feature, or the like to prevent the suction head 120 positioned at the foremost side of the robot cleaner 100 from colliding with the obstacle.

The sensor 130 may be configured to additionally perform other sensing functions in addition to such a detection function. For example, the sensor 130 may include a camera (not shown) for obtaining an image of the surroundings. The camera may include a lens and an image sensor. The camera may convert the image of the surroundings of the cleaner body 110 into an electrical signal that is capable of being processed by the controller 1800, and may transmit an electrical signal corresponding to, for example, an upward image to the controller 1800. The electrical signal corresponding to the upward image may be used for the detection of the position of the cleaner body 110 by the controller 1800.

Of course, the sensor 130 may include an image obtainer. The image obtainer may include a three-dimensional (3D) depth camera configured to obtain an image of the surroundings thereof and detect the distance between the main body and an obstacle. A description of the 3D depth camera will be made later.

In addition, the sensor 130 may detect an obstacle, such as a wall, furniture, or a cliff, present on the surface on which the robot cleaner 100 is traveling or in the route along which the robot cleaner 100 is traveling. In addition, the sensor 130 may detect the presence of a docking device for charging the battery. In addition, the sensor 130 may detect information about the ceiling and may map a travel area or a cleaning area of the robot cleaner 100.

The dust collector 140, configured to separate and collect dust from the suctioned air, may be detachably coupled to the cleaner body 110. The dust collector 140 may be provided with a dust collector cover 150 configured to cover the dust collector 140. In one embodiment, the dust collector cover 150 may be rotatably hinged to the cleaner body 110. The dust collector cover 150 may be secured to the dust collector 140 or the cleaner body 110 and may be maintained in the state of covering the top surface of the dust collector 140. In the state of covering the top surface of the dust collector 140, the dust collector cover 150 may prevent the dust collector 140 from being separated from the cleaner body 110.

A portion of the dust collector 140 may be contained in a dust collector container 113, and another portion of the dust collector 140 may protrude in the backward direction of the cleaner body 110 (i.e. a reserve direction R, opposite the forward direction F).

The dust collector 140 may have an entrance formed therein to allow air containing dust to be introduced thereinto and an exit formed therein to allow air from which dust has been removed to be discharged therefrom. When the dust collector 140 is installed in the cleaner body 110, the entrance and the exit may communicate with the cleaner body 110 through an opening 155 formed in an internal wall of the cleaner body 110. Accordingly, an intake flow passage and an exhaust flow passage may be formed in the cleaner body 110.

Owing to this connection relationship, air containing dust introduced through the suction head 120 may be introduced into the dust collector 140 via the intake flow passage inside the cleaner body 110, and air and dust may be separated from each other through a filter or a cyclone of the dust collector 140. Dust may be collected in the dust collector 140, and air may be discharged from the dust collector 140 and may be finally discharged to the outside via the exhaust flow passage inside the cleaner body 110 and an exhaust port 112.

Hereinafter, an embodiment related to components of the robot cleaner 100 will be described with reference to FIG. 4.

The robot cleaner 100 according to an embodiment of the present disclosure may include at least one of a communication interface 1100, an input device 1200, a driver 1300, a sensor 1400, an output device 1500, a power supply 1600, a memory 1700, a controller 1800, a cleaning device 1900, or combinations thereof.

Specifically, a robot cleaner 100 according to a first embodiment of the present disclosure may include a driver 1300, an image obtainer, and a controller 1800.

Figure 4:
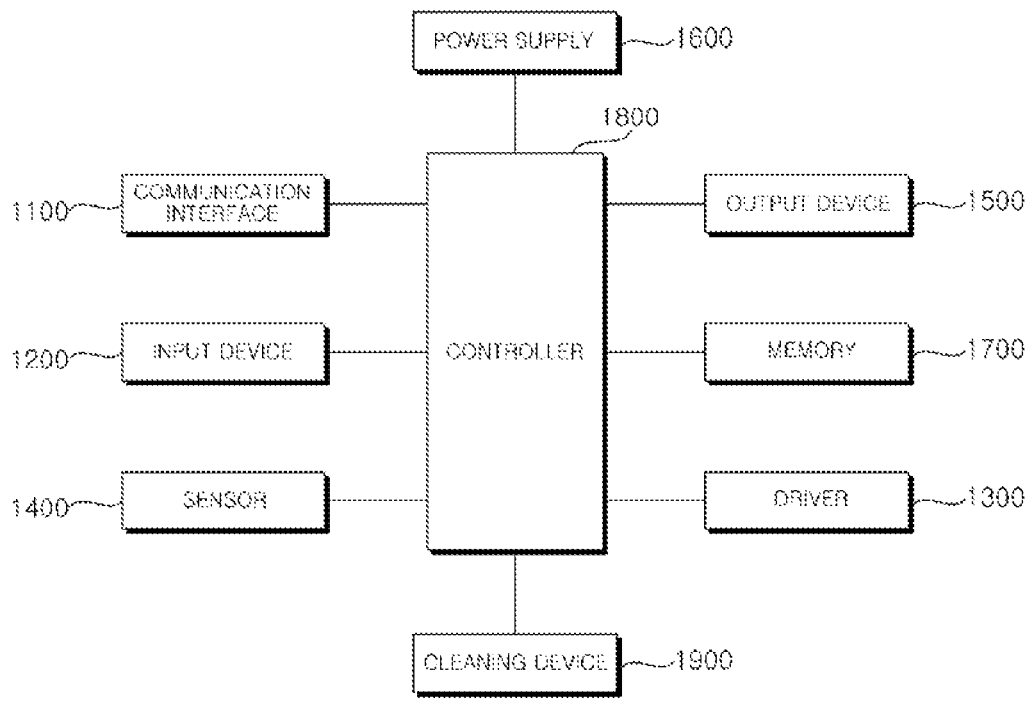
FIG. 4 is a block diagram showing the components of a robot cleaner according to an embodiment of the present disclosure.

The components shown in FIG. 4 are not essential, and a mobile robot including a greater or smaller number of components than those shown in FIG. 4 may be implemented. In addition, as described above, a plurality of robot cleaners described herein may commonly include only some of the components to be described below. That is, respective mobile robots may include different components from each other.

Hereinafter, the components will be described. First, the power supply 1600 may include a battery that is rechargeable by an external commercial power source and may supply power to the mobile robot. The power supply 1600 may supply driving power to each component included in the mobile robot and may supply operating power required to drive the mobile robot or to perform a specific function.

In this case, the controller 1800 may detect the remaining power of the battery. When the remaining power of the battery is insufficient, the controller 1800 may control the mobile robot to move to a charging station connected to the external commercial power source so that the battery is charged with charging current received from the charging station. The battery may be connected to a battery SoC detection sensor, and information on the remaining power and the state of charge (SoC) of the battery may be transmitted to the controller 1800. The output device 1500 may display the remaining power of the battery under the control of the controller 1800.

The battery may be disposed on the lower side of the center of the mobile robot or may be disposed on one of left and right sides of the mobile robot. In the latter case, the mobile robot may further include a balance weight in order to resolve weight imbalance due to the battery.

The controller 1800 may serve to process information on the basis of artificial-intelligence technology, and may include at least one module performing at least one of learning of information, inference of information, perception of information, or processing of a natural language.

The controller 1800 may perform at least one of learning, inferring, or processing a huge amount of information (big data), such as information stored in the cleaner, environment information about a mobile terminal, and information stored in a communication-capable external storage, using machine-learning technology.

In addition, the controller 1800 may predict (or infer) one or more executable operations of the cleaner using information learned using the machine-learning technology, and may control the cleaner to execute an operation having the highest possibility of realization among the one or more predicted operations. The machine-learning technology is technology for collecting and learning a huge amount of information on the basis of at least one algorithm and determining and predicting information on the basis of the learned information.

Learning of information is an operation of recognizing features, rules, determination criteria, and the like of information, quantifying the relationships between pieces of information, and predicting new data using a quantified pattern.

An algorithm used in the machine-learning technology may be an algorithm based on statistics, and may be, for example, a decision tree using a tree structure form as a prediction model, a neural network imitating a neural network structure and function of living things, generic programming based on an evolution algorithm of living things, clustering distributing observed examples to subsets called communities, a Monte Carlo method calculating a function value as a probability through a randomly extracted random number, and the like.

Deep-learning technology, which is one field of machine-learning technology, is technology of performing at least one of learning, determining, or processing information using a deep neural network (DNN) algorithm. The DNN may have a structure of connecting layers and transmitting data between the layers. Such deep-learning technology may enable a huge amount of information to be learned through the DNN using a graphic processing unit (GPU), optimized for parallel arithmetic calculations.

The controller 1800 may be equipped with a learning engine, which detects features for recognizing a specific object using training data stored in an external server or memory. Here, the features for recognizing an object may include the size, shape, shadow, and the like of the object.

In detail, when the controller 1800 inputs a portion of an image, obtained through the image obtainer provided on the cleaner, to the learning engine, the learning engine may recognize at least one object or living thing included in the input image. In more detail, the controller 1800 may recognize a general obstacle and a mat-type obstacle CA through any of various methods, among the recognized objects.

For example, the controller 1800 may determine the presence or absence of an obstacle in the vicinity of the main body by analyzing an image and far and near distances obtained by the image obtainer within the cleaning area B, and may determine whether an obstacle is a mat-type obstacle CA. Upon determining that an obstacle is a mat-type obstacle CA, the controller 1800 may calculate the planar area of the mat-type obstacle CA, and may determine the climbing operation or avoidance operation of the main body based on the planar area of the mat-type obstacle CA.

The controller 1800 may classify an obstacle into a general obstacle and a mat-type obstacle CA based on the above-described information learning or on a given criterion. In one example, the controller 1800 may recognize an object using big data or machine learning, and may control the robot cleaner 100 to avoid or climb the object depending on the characteristics of the corresponding object.

In another example, the controller 1800 may analyze an image and far and near distances obtained by the image obtainer within the cleaning area B, and may determine an obstacle to be a mat-type obstacle CA when the height of the obstacle is less than or equal to a predetermined height (0.3 cm to 1 cm). The controller 1800 may analyze an image and far and near distances obtained by the image obtainer within the cleaning area B, and may determine an obstacle to be a general obstacle when the height of the obstacle exceeds a predetermined height (0.3 cm to 1 cm). In general, the controller 1800 may control the robot cleaner 100 to avoid a general obstacle.

In still another example, the controller 1800 may determine a mat-type obstacle CA based on the similarity between the image of a reference obstacle and the image of the obstacle in the obtained image. Here, the image of a reference obstacle may be learned or prestored data. In detail, the controller 1800 may compare the image of a reference obstacle, including images of various mat-type obstacles CA, with the image of the obstacle in the obtained image, and may determine the obstacle to be a mat-type obstacle CA when the similarity exceeds a predetermined value (90%).

Upon determining that the obstacle in the obtained image is a mat-type obstacle CA, the controller 1800 may determine whether to climb the mat-type obstacle CA. In detail, when the planar area of the mat-type obstacle CA exceeds a predetermined planar area value, the controller may control the driver 1300 such that the main body climbs the mat-type obstacle CA. On the other hand, when the planar area of the mat-type obstacle CA is less than or equal to the predetermined planar area value, the controller 1800 may control the driver 1300 such that the main body avoids the mat-type obstacle CA.

The method of calculating the planar area of the mat-type obstacle CA will be described later with reference to FIG. 6. The controller 1800 may calculate the volume or the planar area of the mat-type obstacle CA by combining the information about the width, length, and height of the mat-type obstacle CA. Here, the planar area may be the area of the mat-type obstacle CA when viewed in plan.

Here, the predetermined planar area value may be 1500 to 2300 cm2. The robot cleaner 100 may avoid a mat-type obstacle CA (e.g. a foot mat) that is smaller than a general towel because the driver 1300 thereof may catch on the mat-type obstacle CA, or the cleaning device thereof may be blocked by the mat-type obstacle CA while climbing the same. On the other hand, the robot cleaner 100 may climb a mat-type obstacle CA (e.g. a carpet) that is larger than a general towel because there is no concern of the driver 1300 thereof catching on the mat-type obstacle CA or of the cleaning device thereof being blocked by the mat-type obstacle CA while climbing the same.

The robot cleaner 100 may calculate the planar area of the mat-type obstacle CA based on the information obtained through the image, and may determine whether to avoid or climb the mat-type obstacle CA based thereon, thereby minimizing damage to the robot cleaner 100 and rapidly and accurately distinguishing between a foot mat and a carpet.

When the main body is located on the mat-type obstacle CA, the controller 1800 may control the cleaning device to perform cleaning corresponding to the mat-type obstacle CA. In detail, when the main body climbs the mat-type obstacle CA based on the obtained image and information input by the sensor, the controller 1800 may control the cleaning device to clean the mat-type obstacle CA. More specifically, the controller 1800 may control the suction pressure of the cleaning device, may control the rotating speed of the sweeping roller, or may control the travel speed of the main body in consideration of the roughness, shape, reflectivity, or the like of the top surface of the mat-type obstacle CA.

When the controller 1800 determines the mat-type obstacle CA to be a carpet based on the image and the robot cleaner 100 climbs the mat-type obstacle CA, the mat-type obstacle CA may be deformed for various reasons such as the physical properties, material, or the like thereof, which is likely to make it difficult for the robot cleaner 100 to climb the same or to cause the robot cleaner 100 to be caught thereon.

In order to solve this problem, the controller 1800 may determine a change in the shape of the mat-type obstacle CA based on the image of the mat-type obstacle CA while the main body is climbing the mat-type obstacle CA. Upon determining that the change in the shape of the mat-type obstacle CA exceeds a predetermined reference level, the controller 1800 may control the driver 1300 such that the main body stops climbing the mat-type obstacle CA and avoids the same.

In detail, when the change in the shape of the mat-type obstacle CA is equal to or less than a predetermined reference level, the controller 1800 may control the driver 1300 such that the main body completely climbs the mat-type obstacle CA. Here, the change in the shape of the mat-type obstacle CA may correspond to the difference between the shape of the mat-type obstacle CA before the robot cleaner 100 climbs the same and the shape of the mat-type obstacle CA after the robot cleaner 100 climbs the same. Preferably, the change in the shape of the mat-type obstacle CA may correspond to the difference between the height of the highest portion of the mat-type obstacle CA before the robot cleaner 100 climbs the same and the height of the highest portion of the mat-type obstacle CA after the robot cleaner 100 climbs the same.

In another example, when the position of the mat-type obstacle CA is not changed (e.g. when the mat-type obstacle CA is not pushed), the controller 1800 may control the driver 1300 such that the main body completely climbs the mat-type obstacle CA. Here, the absence of change in the position of the mat-type obstacle CA may correspond to the case in which the position of the boundary of the opposite end of the mat-type obstacle CA (the end opposite the end of the mat-type obstacle CA that the robot cleaner 100 is climbing) does not fall out of a predetermined range in the coordinate system.

In addition, the controller 1800 may analyze images collected from the cleaning area B, and may specify at least one of the figures determined to be marked on a wall or a ceiling among the collected images as an artificial mark.

In this manner, when the learning engine is applied to travel of the cleaner, the controller 1800 may recognize whether an obstacle such as the legs of a chair, a fan, or a gap in a balcony having a specific form, which obstructs the travel of the cleaner, is present near the cleaner, thereby increasing the efficiency and reliability of travel of the cleaner.

The aforementioned learning engine may be installed in the controller 1800, or may be installed in an external server. When the learning engine is installed in an external server, the controller 1800 may control the communication interface 1100 to transmit at least one image as an analysis target to the external server.

The external server may input an image received from the cleaner to the learning engine, and may recognize at least one object or living thing included in the corresponding image. In addition, the external server may transmit information related to the recognition result to the cleaner. Here, the information related to the recognition result may include information related to the number of objects included in the image as an analysis target and the name of each object.

The driver 1300 may include a motor, and may drive the motor to rotate left and right main wheels in both directions such that the main body is capable of moving or rotating. In this case, the left and right main wheels may be driven independently. The driver 1300 may enable the main body of the mobile robot to move in the forward, backward leftward or rightward direction, to move along a curved route, or to rotate in place.

The input device 1200 may receive various control commands regarding the mobile robot from a user. The input device 1200 may include one or more buttons, for example, a verification button, a setting button, and the like. The verification button may be a button for receiving a command for checking detection information, obstacle information, position information, and map information from the user, and the setting button may be a button for receiving, from the user, a command for setting the aforementioned pieces of information.

In addition, the input device 1200 may include an input reset button for canceling a previous user input and receiving new user input, a delete button for deleting previous user input, a button for setting or changing an operation mode, and a button for receiving a command for returning to the charging station.

In addition, the input device 1200 may be implemented as a hard key, a soft key, a touch pad, or the like, and may be installed on an upper portion of the mobile robot. In addition, the input device 1200 may have the form of a touch screen along with the output device 1500.

The output device 1500 may be installed on the upper portion of the mobile robot. The installation position or the installation type of the output device 1500 may vary. For example, the output device 1500 may display the SoC of the battery or the driving mode of the mobile robot on a screen.

In addition, the output device 1500 may output information on the state of the interior of the mobile robot detected by the sensor 1400, for example, the current state of each component included in the mobile robot. In addition, the output device 1500 may display external state information, obstacle information, position information, map information, and the like detected by the sensor 1400, on the screen.

The output device 1500 may be implemented as any one of a light-emitting diode (LED), a liquid crystal display (LCD), a plasma display panel (PDP), and an organic light-emitting diode (OLED).

The output device 1500 may further include a sound output device, which audibly outputs an operation process or an operation result of the mobile robot performed by the controller 1800. For example, the output device 1500 may output a warning sound to the outside in response to a warning signal generated by the controller 1800.

In this case, the sound output device (not shown) may be a device configured to output a sound, for example, a beeper, a speaker, or the like. The output device 1500 may output audio data or message data having a predetermined pattern stored in the memory 1700 through the sound output device.

Thus, the mobile robot according to an embodiment of the present disclosure may output environment information regarding a traveling region on the screen, or may output the same as a sound through the output device 1500. According to another embodiment, the mobile robot may transmit map information or environment information to a terminal device through the communication interface 1100 such that the terminal device outputs a screen or a sound to be output through the output device 1500.

The memory 1700 may store a control program for controlling or driving the mobile robot and data corresponding thereto. The memory 1700 may store audio information, image information, obstacle information, position information, map information, and the like. In addition, the memory 1700 may store information related to a traveling pattern.

As the memory 1700, non-volatile memory may be mainly used. Here, the non-volatile memory (NVM) (or NVRAM) may be a storage device capable of continuously maintaining stored information even though power is not supplied thereto. For example, the memory 1700 may be a ROM, a flash memory, a magnetic computer storage device (e.g. a hard disk, a disk drive, or a magnetic tape), an optical disk drive, a magnetic RAM, a PRAM, or the like.

The sensor 1400 may include at least one of an external signal detection sensor, a front detection sensor, a cliff sensor, a two-dimensional (2D) camera sensor, or a three-dimensional (3D) camera sensor.

The external signal detection sensor may detect an external signal of the mobile robot. The external signal detection sensor may be, for example, an infrared sensor, an ultrasonic sensor, a radio frequency (RF) sensor, or the like.

The mobile robot may verify the position and direction of the charging station upon receiving a guide signal generated by the charging station using the external signal detection sensor. Here, the charging station may transmit the guide signal indicating the direction and the distance such that the mobile robot returns to the charging station. That is, upon receiving the signal transmitted from the charging station, the mobile robot may determine the current position thereof, and may set a movement direction to return to the charging station.

The front detection sensor may be provided in a plural number such that the front detection sensors are installed at regular intervals on the front side of the mobile robot, specifically, along the outer circumference of the side surface of the mobile robot. The front detection sensor may be disposed on at least one side surface of the mobile robot to detect an obstacle ahead. The front detection sensor may detect an object, in particular, an obstacle, present in the movement direction of the mobile robot, and may transmit detection information to the controller 1800. That is, the front detection sensor may detect a protrusion, furnishings, furniture, a wall surface, a wall corner, or the like present in a route along which the mobile robot moves, and may transmit corresponding information to the controller 1800.

The front detection sensor may be, for example, an infrared sensor, an ultrasonic sensor, an RF sensor, a geomagnetic sensor, or the like. The mobile robot may use one type of sensor as the front detection sensor, or may use two or more types of sensors together as the front detection sensor as needed.

For example, in general, the ultrasonic sensor may mainly be used to detect an obstacle in a remote area. The ultrasonic sensor may include a transmitter and a receiver. The controller 1800 may determine whether an obstacle is present based on whether an ultrasonic wave radiated from the transmitter is reflected by an obstacle or the like and received by the receiver, and may calculate the distance to the obstacle using an ultrasonic wave radiation time and an ultrasonic wave reception time.

In addition, the controller 1800 may detect information related to the size of an obstacle by comparing an ultrasonic wave radiated from the transmitter with an ultrasonic wave received by the receiver. For example, when a larger magnitude of ultrasonic wave is received by the receiver, the controller 1800 may determine that the size of the obstacle is larger.

In one embodiment, a plurality of ultrasonic sensors (e.g. five ultrasonic sensors) may be installed on the outer circumferential surface of the front side of the mobile robot. In this case, preferably, the transmitters and the receivers of the ultrasonic sensors may be installed alternatingly on the front surface of the mobile robot.

That is, the transmitters may be disposed so as to be spaced apart from each other in the leftward-and-rightward direction with respect to the center of the front surface of the main body of the mobile robot, and one or two or more transmitters may be provided between the receivers to form a reception region of an ultrasonic signal reflected from the obstacle or the like. Due to this disposition, a reception region may be expanded while reducing the number of sensors. The angle at which the ultrasonic wave is radiated may be maintained at an angle within a range within which other signals are not affected, thereby preventing a crosstalk phenomenon. In addition, the reception sensitivities of the receivers may be set to be different from each other.

In addition, the ultrasonic sensors may be installed so as to be oriented upwards at a predetermined angle such that the ultrasonic waves radiated from the ultrasonic sensors are output upwards. In this case, in order to prevent the ultrasonic waves from being radiated downwards, a blocking member may be further provided.

As mentioned above, two or more types of sensors may be used together as the front detection sensors. In this case, one or more types of sensors among an infrared sensor, an ultrasonic sensor, and an RF sensor may be used as the front detection sensors.

In one example, the front detection sensor may include an infrared sensor as a different type of sensor, in addition to the ultrasonic sensor. The infrared sensor may be installed on the outer circumferential surface of the mobile robot together with the ultrasonic sensor. The infrared sensor may also detect an obstacle present ahead of or beside the mobile robot and may transmit corresponding obstacle information to the controller 1800. That is, the infrared sensor may detect a protrusion, furnishings, furniture, a wall surface, a wall corner, or the like present in a route along which the mobile robot moves, and may transmit corresponding information to the controller 1800. Thus, the mobile robot may move within a cleaning area without colliding with an obstacle.

Various types of optical sensors may be mainly used as the cliff sensor. The cliff sensor may detect an obstacle on the floor supporting the main body of the mobile robot. The cliff sensor may be installed on the rear surface of the mobile robot. However, the cliff sensor may be installed at different positions depending on the type of the mobile robot.

The cliff sensor may be disposed on the rear surface of the mobile robot to detect an obstacle on the floor. The cliff sensor may be an infrared sensor including a light transmitter and a light receiver, an ultrasonic sensor, an RF sensor, a position sensitive detection (PSD) sensor, or the like, like the obstacle detection sensor.

In one example, any one of cliff sensors may be installed on the front side of the mobile robot, and the other two cliff sensors may be installed on a relatively rear side of the mobile robot. For example, the cliff sensor may be a PSD sensor, or may include a plurality of different types of sensors.

The PSD sensor detects the positions of the short and long distances of incident light with a single p-n junction using the surface resistance of a semiconductor. The PSD sensor may be classified into a one-dimensional (1D) PSD sensor that detects light on a single axis and a 2D PSD sensor that detects the position of light on a plane. Both the 1D PSD sensor and the 2D PSD sensor may have a pin photodiode structure. The PSD sensor is a type of infrared sensor that transmits an infrared ray to an obstacle and measures the angle between the infrared ray transmitted to the obstacle and the infrared ray returning thereto after being reflected from the obstacle, thus measuring the distance to the obstacle. That is, the PSD sensor calculates the distance to an obstacle using triangulation.

The PSD sensor may include a light transmitter configured to emit an infrared ray to an obstacle and a light receiver configured to receive an infrared ray returning thereto after being reflected from the obstacle. In general, the PSD sensor is formed as a module. In the case in which an obstacle is detected using the PSD sensor, a consistent measurement value may be obtained regardless of differences in reflectivity or the color of obstacles.

The cleaning device 1900 may clean the designated cleaning area in response to a control command transmitted from the controller 1800. The cleaning device 1900 may scatter surrounding dust through a brush (not shown) that scatters dust in the designated cleaning area and may then drive a suction fan and a suction motor to suction the scattered dust. In addition, the cleaning device 1900 may mop the designated cleaning area according to the replacement of the cleaning tool.

The controller 1800 may measure the angle between an infrared ray radiated toward the floor from the cliff sensor and an infrared ray received by the cliff sensor after being reflected from an obstacle to detect a cliff, and may analyze the depth of the cliff.

The controller 1800 may determine the state of a cliff detected by the cliff sensor and may determine whether the mobile robot is capable of passing over the cliff based on the result of determining the state of the cliff. In one example, the controller 1800 may determine the presence or absence of a cliff and the depth of a cliff using the cliff sensor and may allow the mobile robot to pass over the cliff only when the cliff sensor senses a reflection signal. In another example, the controller 1800 may determine whether the mobile robot is being lifted using the cliff sensor.

The 2D camera sensor may be provided on one surface of the mobile robot and may obtain image information related to the surroundings of the main body during movement. An optical flow sensor may convert an image of the lower side input from an image sensor provided therein to generate image data in a predetermined format. The generated image data may be stored in the memory 1700.

In addition, one or more light sources may be installed adjacent to the optical flow sensor. The one or more light sources may radiate light to a predetermined region of the floor that is photographed by the image sensor. When the mobile robot moves a specific region on the floor, if the floor is flat, a uniform distance may be maintained between the image sensor and the floor.

On the other hand, in the case in which the mobile robot moves on a floor that is uneven, the image sensor may become distant from the floor by a predetermined distance or more due to depressions and protrusions in the floor and obstacles on the floor. In this case, the controller 1800 may control the one or more light sources to adjust the amount of light radiated therefrom. The light sources may be light-emitting devices, for example, light-emitting diodes (LEDs), which are capable of adjusting the amount of light.

The controller 1800 may detect the position of the mobile robot using the optical flow sensor regardless of slippage of the mobile robot. The controller 1800 may compare and analyze image data captured by the optical flow sensor over time to calculate a movement distance and a movement direction, and may calculate the position of the mobile robot based thereon. By using the image information regarding the lower side of the mobile robot using the optical flow sensor, the controller 1800 may perform correction resistant to slippage with respect to the position of the mobile robot, which is calculated by other devices.

The 3D camera sensor may be attached to one surface or a portion of the main body of the mobile robot, and may generate 3D coordinate information related to the surroundings of the main body. For example, the 3D camera sensor may be a 3D depth camera configured to calculate the distance between the mobile robot and a target to be photographed.

In detail, the 3D camera sensor may capture a 2D image related to the surroundings of the main body and may generate a plurality of pieces of 3D coordinate information corresponding to the captured 2D image.

In one embodiment, the 3D camera sensor may be of a stereovision type. That is, the 3D camera sensor may include two or more typical cameras obtaining 2D images and may combine two or more images obtained by the two or more cameras to generate 3D coordinate information.

In detail, the 3D camera sensor according to the embodiment may include a first pattern transmitter configured to radiate light having a first pattern downwards toward a region ahead of the main body, a second pattern transmitter configured to radiate light having a second pattern upwards toward a region ahead of the main body, and an image obtainer configured to obtain a forward image of the main body. Accordingly, the image obtainer may obtain an image of a region on which the light having a first pattern and the light having a second pattern are incident.

In another embodiment, the 3D camera sensor may include a single camera and an infrared pattern transmitter configured to radiate an infrared pattern, and may measure the distance between the 3D camera sensor and a target to be photographed by capturing a shape in which an infrared pattern radiated from the infrared pattern transmitter is projected onto the target to be photographed. This 3D camera sensor may be an infrared-type 3D camera sensor.

In still another embodiment, the 3D camera sensor may include a single camera and a light emitter configured to emit a laser beam, and may measure the distance between the 3D camera sensor and a target to be photographed by receiving a portion of the laser beam reflected from the target to be photographed after being emitted from the light emitter and analyzing the received laser beam. This 3D camera sensor may be a time-of-flight (ToF)-type 3D camera sensor.

In detail, the above 3D camera sensor may be configured to radiate a laser beam in a form extending in at least one direction. In one example, the 3D camera sensor may include first and second lasers such that the first laser radiates linear laser beams intersecting each other and the second laser radiates a single linear laser beam. According to this, the lowermost laser beam may be used to detect an obstacle located at a lower region, the uppermost laser beam may be used to detect an obstacle located at an upper region, and the intermediate laser beam between the lowermost laser beam and the uppermost laser beam may be used to detect an obstacle located at an intermediate region.

The sensor 1400 may collect information on an artificial mark within the cleaning area B. In detail, the 2D or 3D camera sensor may collect an image including information on an artificial mark within the cleaning area B.

The communication interface 1100 may be connected to a terminal device and/or another device present within a specific region (which will be interchangeably used with the term "home appliance" in this specification) in any one of wired, wireless, and satellite communication schemes to exchange signals and data therewith.

The communication interface 1100 may transmit and receive data to and from another device present within a specific region. Here, the other device may be any device, as long as it is capable of transmitting and receiving data over a network. For example, the other device may be an air conditioner, a heater, an air purifier, a lamp, a TV, a vehicle, or the like. Alternatively, the other device may be a device for controlling a door, a window, a water valve, a gas valve, or the like. Alternatively, the other device may be a sensor for sensing temperature, humidity, atmospheric pressure, gas, or the like.

In addition, the communication interface 1100 may communicate with another robot cleaner 100 present within a specific region or within a predetermined range.

Although not illustrated, a plurality of mobile robots may communicate with a terminal (not shown) through network communication, and may also communicate with each other.

Here, the network communication may be a short-range communication using at least one wireless communication technology selected from among Wireless LAN (WLAN), Wireless Personal Area Network (WPAN), Wireless-Fidelity (Wi-Fi), Wireless-Fidelity (Wi-Fi) Direct, Digital Living Network Alliance (DLNA), Wireless Broadband (WiBro), World Interoperability for Microwave Access (WiMAX), ZigBee, Z-wave, Bluetooth, Radio Frequency Identification (RFID), Infrared Data Association (IrDA), Ultra-Wide Band (UWB), and Wireless Universal Serial Bus (Wireless USB).

Figure 5:
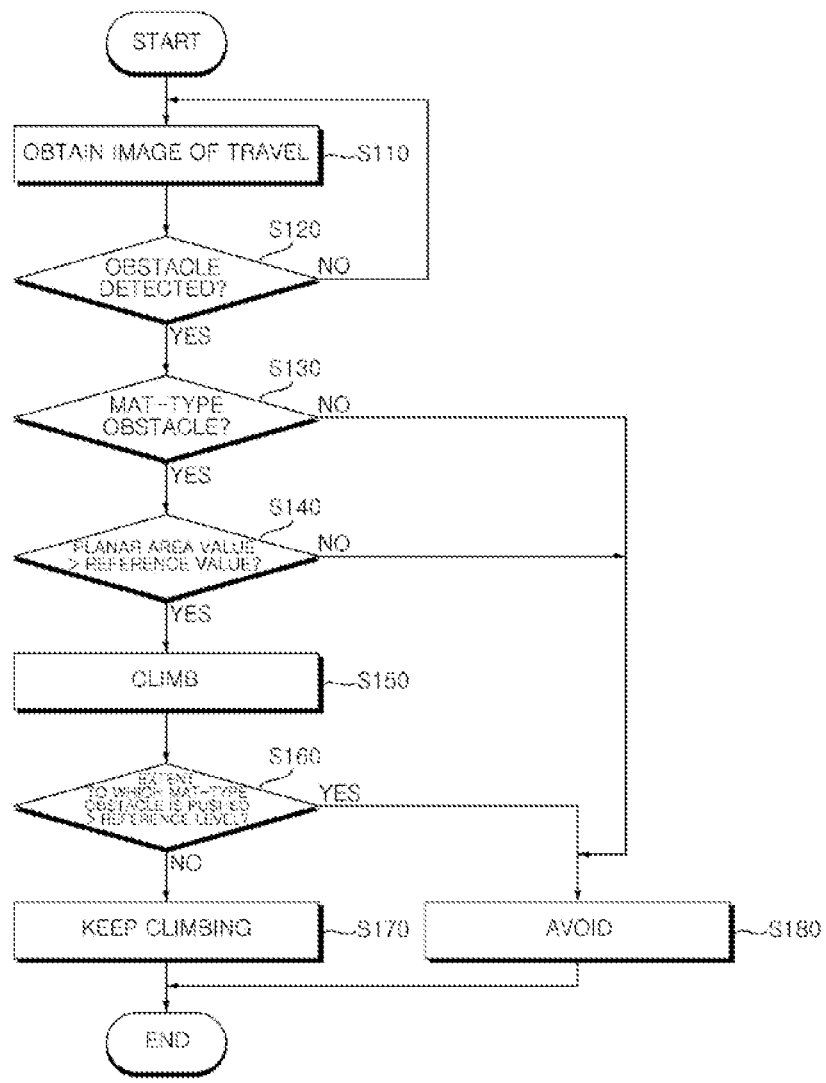
FIG. 5 is a flowchart for explaining a method of controlling a robot cleaner according to a first embodiment of the present disclosure.
Figure 6A:
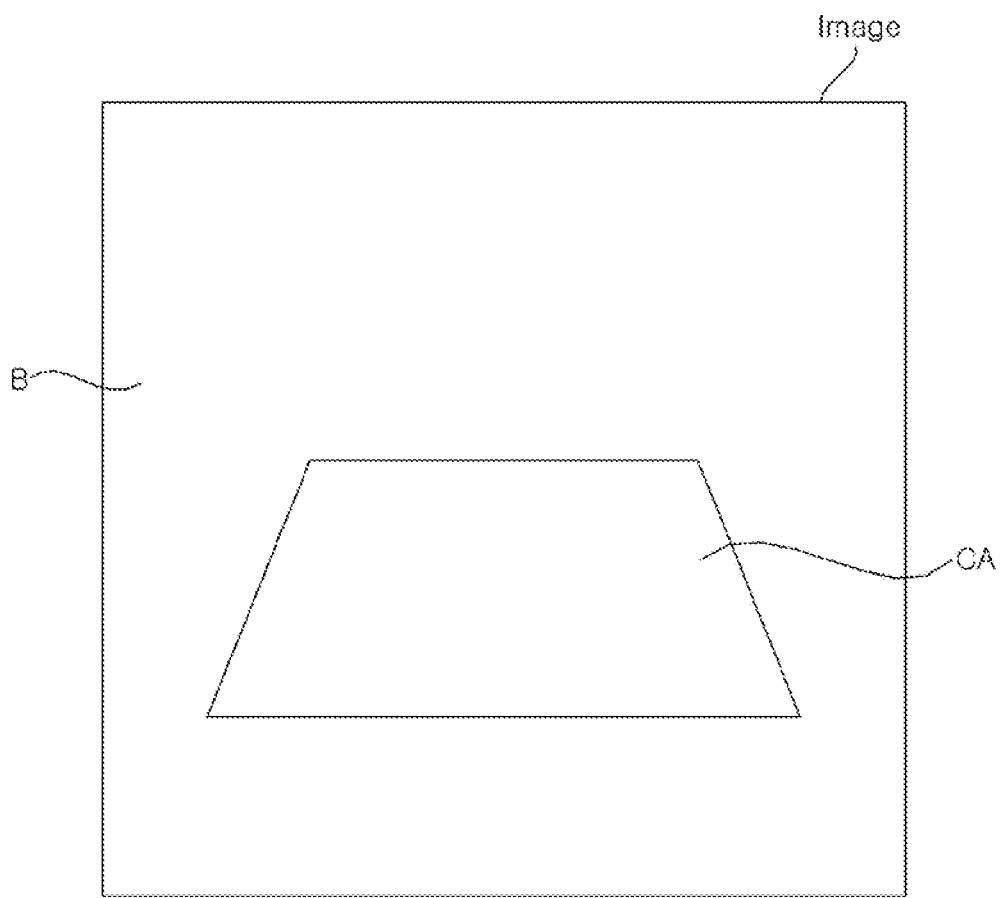
FIG. 6A is a view showing an image obtained by the robot cleaner according to the present disclosure.
Figure 6B:
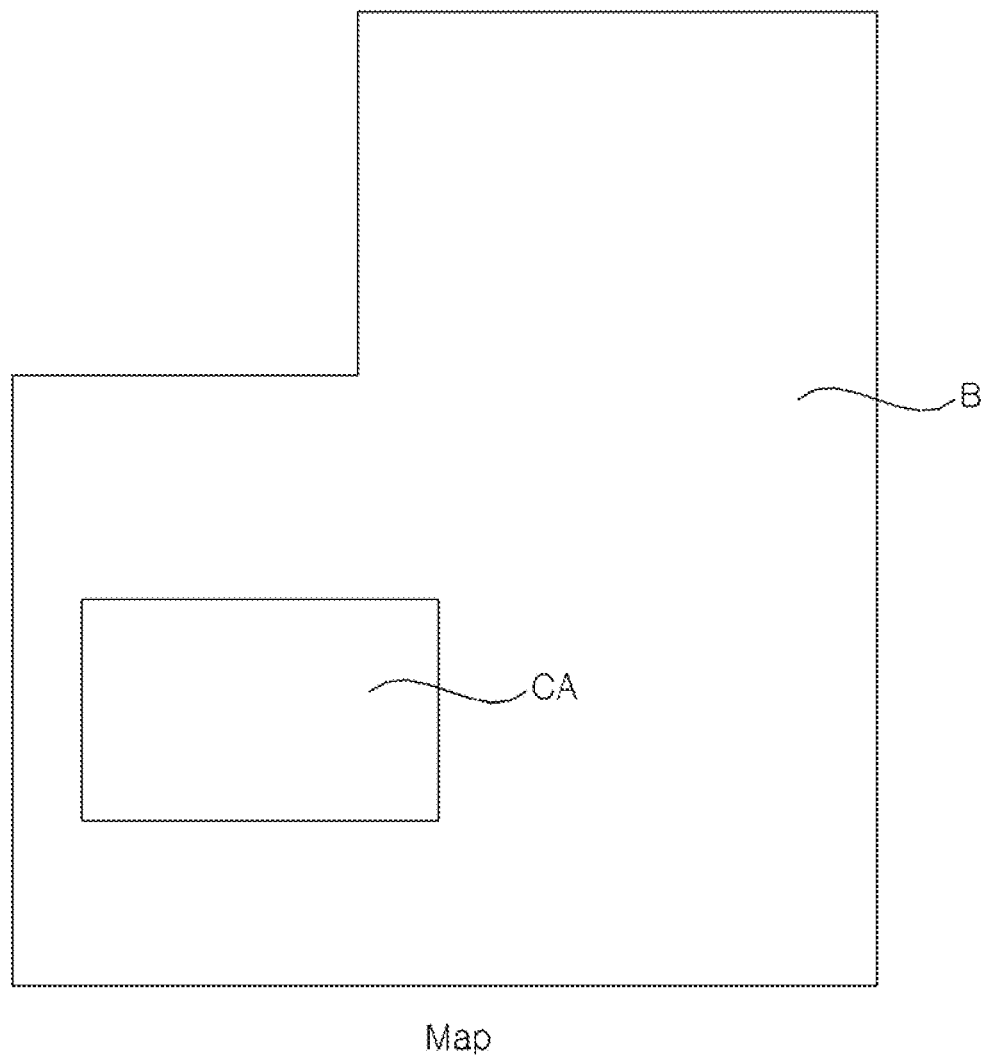
FIG. 6B is a view for explaining a process of marking a mat-type obstacle on an obstacle map based on the image obtained by the robot cleaner according to the present disclosure.
Figure 7:
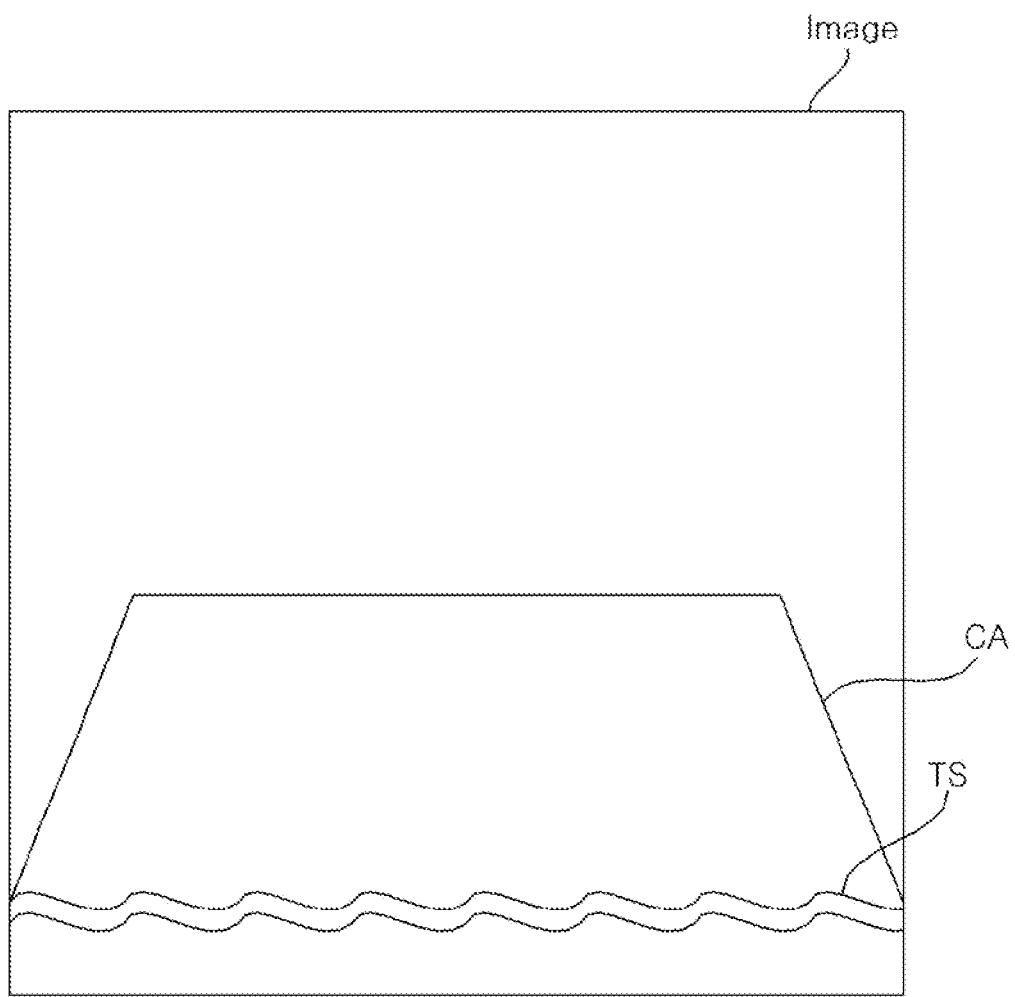
FIG. 7 is a view showing a change in the shape of a mat-type obstacle that occurs when the robot cleaner according to the present disclosure climbs the mat-type obstacle.

FIG. 5 is a flowchart for explaining a method of controlling the robot cleaner 100 according to a first embodiment of the present disclosure, FIG. 6A is a view showing an image obtained by the robot cleaner 100 according to the present disclosure, FIG. 6B is a view for explaining a process of marking a mat-type obstacle CA on an obstacle map based on the image obtained by the robot cleaner according to the present disclosure, and FIG. 7 is a view showing a change in the shape of a mat-type obstacle CA that occurs when the robot cleaner 100 according to the present disclosure climbs the mat-type obstacle CA.

Hereinafter, a method of controlling the robot cleaner 100 according to the present disclosure will be described with reference to FIGS. 5 to 7. The same components and procedures in the drawings will be denoted by the same reference numerals, and a duplicate explanation thereof will be omitted.

The control method may be performed by the controller 1800 or 140. The present disclosure may be a method of controlling the robot cleaner 100, or may be a robot cleaner 100 including the controller 1800 or 140 performing the control method. The present disclosure may be a computer program implementing each step of the control method, or may be a recording medium on which a program for implementing the control method is recorded. "Recording medium" means a computer-readable recording medium. The present disclosure may be a control system of the robot cleaner 100, which includes both hardware and software.

Operation steps of the procedures shown in the flowcharts of the control method and combinations of the procedures shown in the flowcharts may be performed by computer program instructions. The computer program instructions may be installed in a processor of a general-use computer, a special-use computer, or other programmable data-processing device, and the instructions may perform the steps described in connection with the procedure(s) shown in the flowcharts.

In some embodiments, the steps mentioned in the procedures may be performed out of order. For example, two steps shown in succession may be performed substantially simultaneously, or the steps may sometimes be performed in reverse order according to the corresponding functions.

A method of controlling a mobile robot according to an embodiment of the present disclosure may include an image acquisition step of obtaining an image of the surroundings of the mobile robot and far and near distances between the mobile robot and an obstacle (S110), a step of determining an obstacle based on the obtained image and far and near distances (S120), a step of determining whether the obstacle is a mat-type obstacle CA (S130), a step of calculating the planar area of the mat-type obstacle CA (S140), and a step of controlling the mobile robot to climb the mat-type obstacle CA when the planar area of the mat-type obstacle CA exceeds a predetermined planar area value (S150).

In the image acquisition step S110, the robot cleaner 100 may obtain an image of the surroundings of the robot cleaner 100, far and near distances to an obstacle, and 3D coordinates of the surroundings of the mobile robot in real time while traveling. The controller 1800 or 140 may control the image acquisition unit to obtain an image and 3D coordinates of the surroundings of the robot cleaner 100 at regular intervals while the robot cleaner 100 is traveling. Here, the image of the surroundings of the robot cleaner 100 may include images of regions ahead of and beside the robot cleaner 100.

In the step S120 of determining an obstacle based on the obtained image and far and near distances, the robot cleaner 100 may determine whether an obstacle is present in the cleaning area B based on information on the images and 3D coordinates of the obstacle and the surroundings.

In the step S130 of determining whether the obstacle is a mat-type obstacle CA, the robot cleaner 100 may determine whether the obstacle is a general obstacle or a mat-type obstacle CA based on the above-described information learning or a given criterion. The criterion based on which whether the obstacle is a mat-type obstacle CA is determined has been described above.

In the step S140 of calculating the planar area of *?*the mat-type obstacle CA, the robot cleaner 100 may calculate the planar area of *?*the mat-type obstacle CA in the manner shown in FIGS. 5 and 6. Specifically, as shown in FIG. 6A, the overall shape and the boundary of the mat-type obstacle CA may be specified by the image obtainer, and as shown in FIG. 6B, the shape of the mat-type obstacle CA may be displayed on the planar coordinate system by combining information about the width, length, and height of the mat-type obstacle CA, thereby calculating the planar area of *?*the mat-type obstacle CA.

In the step S150 of climbing the mat-type obstacle CA, when the planar area of the mat-type obstacle CA exceeds a predetermined planar area value, the driver 1300 of the robot cleaner 100 may be controlled such that the main body climbs the mat-type obstacle CA. This is because a carpet having a relatively large planar area, among mat-type obstacles, needs to be cleaned.

In the embodiment, the control method may further include a step of controlling the robot cleaner 100 to avoid the mat-type obstacle CA (S180) when the planar area of the mat-type obstacle CA is less than or equal to a predetermined planar area value. Here, the operation of avoiding the mat-type obstacle CA may mean that the controller 1800 controls the driver 1300 such that the robot cleaner 100 travels or cleans the cleaning area, excluding the mat-type obstacle CA.

Subsequently, the robot cleaner 100 may detect whether the mat-type obstacle CA is pushed while climbing the mat-type obstacle CA (S160). When the mat-type obstacle CA is pushed, the robot cleaner 100 may avoid the mat-type obstacle CA (S180). When the mat-type obstacle CA is not pushed, the robot cleaner 100 may keep climbing the mat-type obstacle CA.

When the robot cleaner 100 determines the mat-type obstacle CA to be a carpet based on the image and climbs the mat-type obstacle CA, the mat-type obstacle CA may be deformed (e.g. may be wrinkled (refer to "TS" in FIG. 7)) or may be pushed back for various reasons such as the physical properties, material, or the like thereof, which is likely to make it difficult for the robot cleaner 100 to climb the same or to cause the robot cleaner 100 to be caught thereon.

In order to solve this problem, the robot cleaner 100 may determine a change in the shape of the mat-type obstacle CA based on the image of the mat-type obstacle CA while climbing the mat-type obstacle CA (S160). Upon determining that the change in the shape of the mat-type obstacle CA exceeds a predetermined reference level, the robot cleaner 100 may stop climbing the mat-type obstacle CA and may avoid the same (S180).

When the change in the shape of the mat-type obstacle CA is equal to or less than a predetermined reference level, the robot cleaner 100 may completely climb the mat-type obstacle CA or may keep climbing the mat-type obstacle CA. Here, the state in which the robot cleaner 100 completely climbs the mat-type obstacle CA or keeps climbing the mat-type obstacle CA may be the state in which the robot cleaner 100 is completely located on the mat-type obstacle CA.

In another example, the robot cleaner 100 may determine whether the mat-type obstacle CA is pushed based on the image of the mat-type obstacle CA while climbing the mat-type obstacle CA (S160). Upon determining that the extent to which the mat-type obstacle CA is pushed exceeds a predetermined reference level, the robot cleaner 100 may stop climbing the mat-type obstacle CA and may avoid the same (S180).

When the extent to which the mat-type obstacle CA is pushed is equal to or less than a predetermined reference level, the robot cleaner 100 may completely climb the mat-type obstacle CA or may keep climbing the mat-type obstacle CA.

Here, the extent to which the mat-type obstacle CA is pushed may be the extent to which the position of the boundary of the opposite end of the mat-type obstacle CA (the end opposite the end of the mat-type obstacle CA that the robot cleaner 100 is climbing) falls out of a predetermined range in the coordinate system.

In addition, the robot cleaner 100 may store information on whether the mat-type obstacle CA is a climbable obstacle in an obstacle map, and may transmit the information to another robot cleaner 100.

Figure 8:
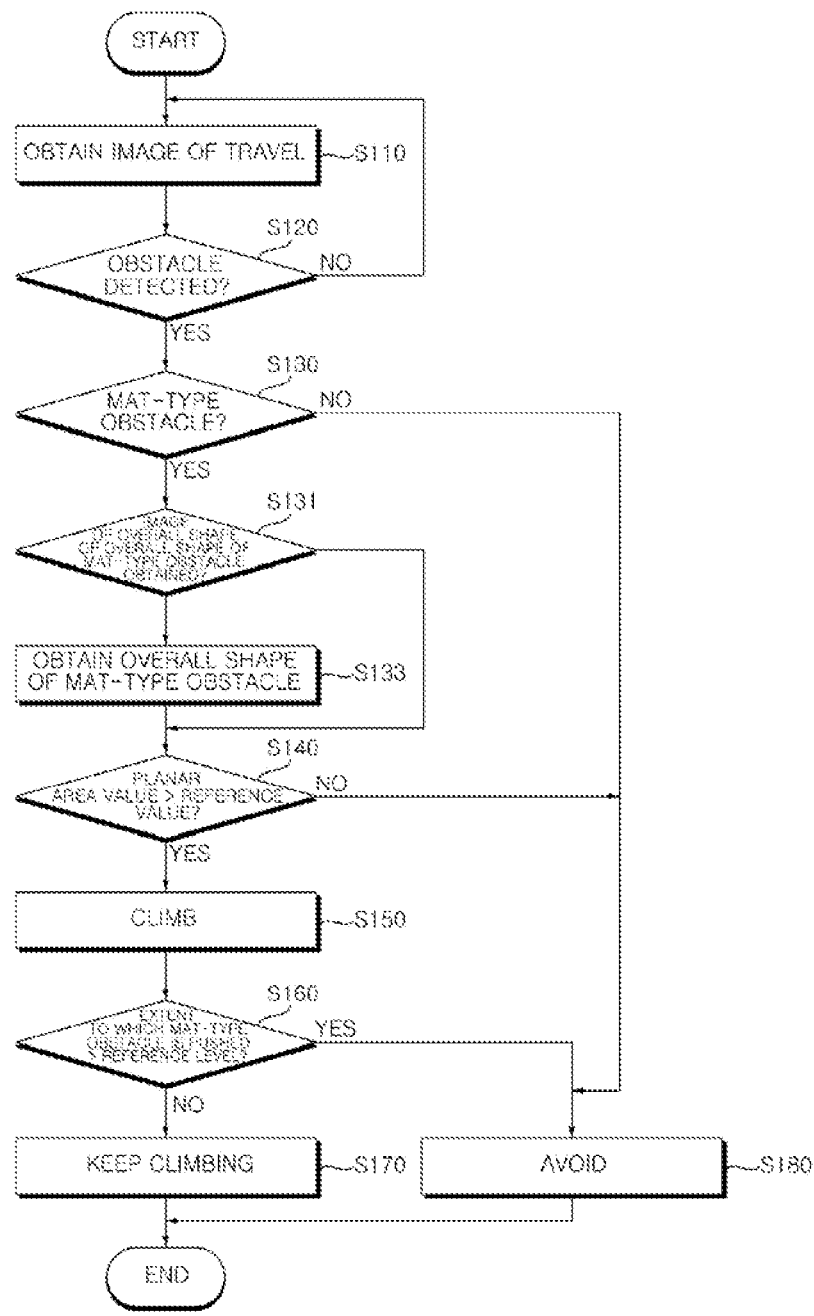
FIG. 8 is a flowchart for explaining a method of controlling a robot cleaner according to a second embodiment of the present disclosure.
Figure 9A:
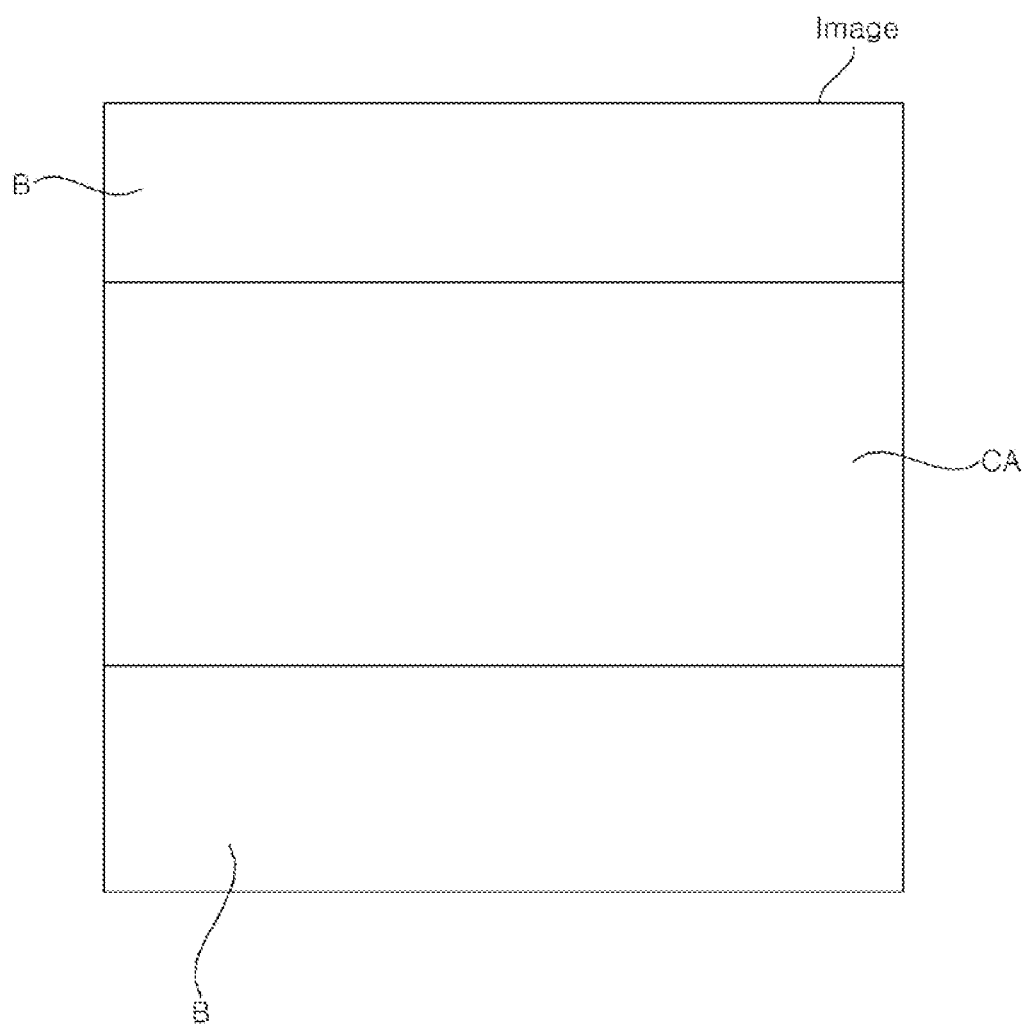
FIG. 9A is a view showing an image obtained by the robot cleaner according to the present disclosure.
Figure 9B:
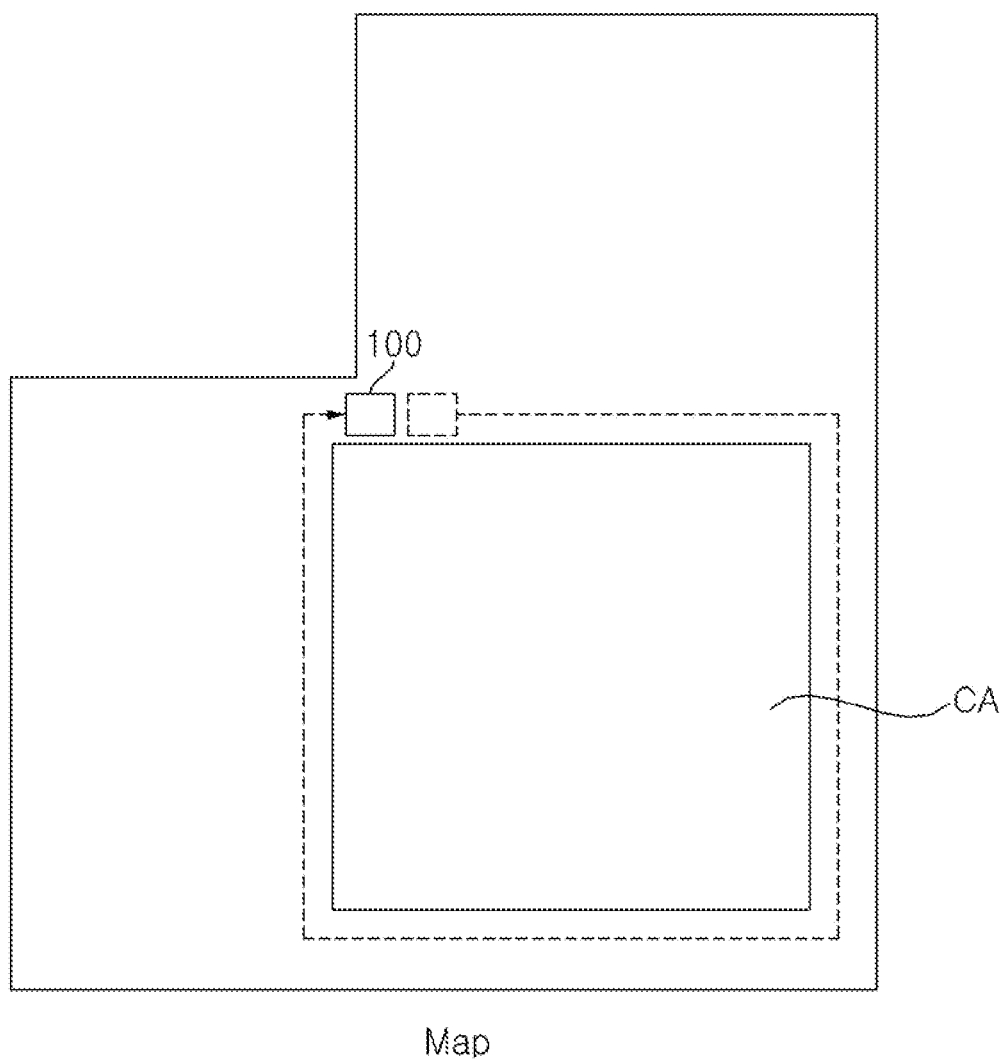
FIG. 9B is a view for explaining the operation of the robot cleaner according to the present disclosure, which obtains an image of the overall shape of a mat-type obstacle and displays the image on a map.

FIG. 8 is a flowchart for explaining a method of controlling the robot cleaner 100 according to a second embodiment of the present disclosure, FIG. 9A is a view showing an image obtained by the robot cleaner 100 according to the present disclosure, and FIG. 9B is a view for explaining the operation of the robot cleaner 100 according to the present disclosure, which obtains an image of the overall shape of the mat-type obstacle CA and displays the image on a map.

Compared to the first embodiment, a method of controlling the robot cleaner 100 according to the second embodiment may further include a step of determining whether an image of the overall shape of the mat-type obstacle CA has been obtained (S131) and a step of obtaining an image of the overall shape of the mat-type obstacle CA (S133).

In the step S131 of determining whether an image of the overall shape of the mat-type obstacle CA has been obtained, upon determining that the obstacle is a mat-type obstacle CA, the robot cleaner 100 may determine whether an image of the overall shape of the mat-type obstacle CA has been obtained.

In detail, as shown in FIG. 9A, when the overall boundary (shape) of the mat-type obstacle CA is not included in an image obtained by the image obtainer, the controller 1800 may determine that an image of the overall shape of the mat-type obstacle CA has not been obtained. On the other hand, as shown in FIG. 6A, when the overall boundary (shape) of the mat-type obstacle CA is included in an image obtained by the image obtainer, the controller 1800 may determine that an image of the overall shape of the mat-type obstacle CA has been obtained.

In the step S133 of obtaining an image of the overall shape of the mat-type obstacle CA, as shown in FIG. 9B, the robot cleaner 100 may collect information about an image, far and near distances, and 3D coordinates of the mat-type obstacle CA while traveling along the boundary of the mat-type obstacle CA.

Specifically, when an image of the overall shape of the mat-type obstacle CA has not been obtained, the controller 1800 may control the driver 1300 and the image obtainer such that the robot cleaner 100 obtains an image of the overall shape of the mat-type obstacle CA while traveling around the mat-type obstacle CA (or traveling along the boundary of the mat-type obstacle CA). More specifically, the robot cleaner 100 may obtain an image of the overall shape of the mat-type obstacle CA while traveling along the boundary of the mat-type obstacle CA, which is invisible in the obtained image.

The controller 1800 may calculate the planar area of the mat-type obstacle CA after obtaining an image of the overall shape of the mat-type obstacle CA. This is because the robot cleaner 100 may erroneously calculate the planar area of the mat-type obstacle CA when an image of the overall shape of the mat-type obstacle CA is not completely obtained. Thus, it is required to accurately recognize the overall shape of the mat-type obstacle CA before calculating the planar area of the mat-type obstacle CA.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A mobile robot comprising:
    a driver configured to move a main body;
    an image obtainer configured to obtain an image of surroundings and far and near distances between the main body and an obstacle; and
    a controller configured to analyze the image and the far and near distances obtained by the image obtainer and to determine whether the obstacle is present near the main body,
    wherein the controller determines whether the obstacle is a mat-type obstacle,
    wherein, upon determining that the obstacle is a mat-type obstacle, the controller calculates a planar area of the mat-type obstacle, and determines a climbing operation or an avoidance operation of the main body based on the planar area of the mat-type obstacle,
    wherein the controller determines a change in shape of the mat-type obstacle based on an
    image of the mat-type obstacle while the main body is climbing the mat-type obstacle, and wherein, when the change in the shape of the mat-type obstacle exceeds a predetermined reference level, the controller controls the driver such that the main body stops climbing the mat-type obstacle and avoids the mat-type obstacle.

2. The mobile robot of claim 1, wherein the controller determines the mat-type obstacle based on similarity between an image of a reference obstacle and the image of the obstacle in the obtained image.

3. The mobile robot of claim 1, wherein, when a height of the obstacle in the obtained image is less than a predetermined height, the controller determines that the obstacle is the mat-type obstacle.

4. The mobile robot of claim 1, wherein, when the planar area of the mat-type obstacle exceeds a predetermined planar area value, the controller controls the driver such that the main body climbs the mat-type obstacle.

5. The mobile robot of claim 4, further comprising:
    a cleaning device configured to perform a cleaning function,
    wherein, when the main body is located on the mat-type obstacle, the controller controls the cleaning device to perform cleaning corresponding to the mat-type obstacle.

6. The mobile robot of claim 1, wherein, when the change in the shape of the mat-type obstacle is equal to or less than the predetermined reference level, the controller controls the driver such that the main body completely climbs the mat-type obstacle.

7. The mobile robot of claim 1, wherein, when the planar area of mat-type obstacle is equal to or less than a predetermined planar area value, the controller controls the driver such that the main body avoids the mat-type obstacle.

8. The mobile robot of claim 1, wherein, when an image of an overall shape of the mat-type obstacle is not obtained, the controller controls the driver and the image obtainer to obtain the image of the overall shape of the mat-type obstacle while traveling around the mat-type obstacle.

9. The mobile robot of claim 8, wherein the controller calculates the planar area of the mat-type obstacle after obtaining the image of the overall shape of the mat-type obstacle.

10. The mobile robot of claim 1, wherein the image obtainer comprises a three-dimensional depth camera.

11. A method of controlling a mobile robot, the method comprising:
    obtaining an image of surroundings of the mobile robot and far and near distances between the mobile robot and an obstacle;
    determining an obstacle based on the obtained image and far and near distances and determining whether the obstacle is a mat-type obstacle;
    calculating a planar area of the mat-type obstacle;
    controlling the mobile robot to climb the mat-type obstacle when the planar area of the mat-type obstacle exceeds a predetermined planar area value; and
    controlling the mobile robot to stop climbing the mat-type obstacle and to avoid the mat-type obstacle when a change in shape of the mat-type obstacle exceeds a predetermined reference level while the mobile robot is climbing the mat-type obstacle.

12. The method of claim 11, further comprising:
    controlling the mobile robot to avoid the mat-type obstacle when the planar area of the mat-type obstacle is less than the predetermined planar area value.

* * * * *